(12) United States Patent
Hou

(10) Patent No.: US 11,907,076 B2
(45) Date of Patent: Feb. 20, 2024

(54) DATA SNAPSHOT METHOD AND APPARATUS, COMPUTER DEVICE, AND STORAGE MEDIUM

(71) Applicant: INSPUR SUZHOU INTELLIGENT TECHNOLOGY CO., LTD., Jiangsu (CN)

(72) Inventor: Bin Hou, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/013,522

(22) PCT Filed: Feb. 24, 2021

(86) PCT No.: PCT/CN2021/077594
§ 371 (c)(1),
(2) Date: Jul. 6, 2023

(87) PCT Pub. No.: WO2022/016863
PCT Pub. Date: Jan. 27, 2022

(65) Prior Publication Data
US 2023/0385155 A1    Nov. 30, 2023

(30) Foreign Application Priority Data

Jul. 21, 2020 (CN) .......................... 202010705961.8

(51) Int. Cl.
*G06F 11/14*   (2006.01)
(52) U.S. Cl.
CPC ...... *G06F 11/1451* (2013.01); *G06F 11/1448* (2013.01); *G06F 11/1458* (2013.01)

(58) Field of Classification Search
CPC ............. G06F 11/1451; G06F 11/1448; G06F 11/1458
(Continued)

(56) References Cited

U.S. PATENT DOCUMENTS

2004/0117572 A1    6/2004  Welsh et al.

FOREIGN PATENT DOCUMENTS

| CN | 1658168 A | 8/2005 |
|---|---|---|
| CN | 102968381 A | 3/2013 |

(Continued)

OTHER PUBLICATIONS

International Search report for application No. PCT/CN2021/077594 dated May 28, 2021.
(Continued)

*Primary Examiner* — David Yi
*Assistant Examiner* — Zubair Ahmed
(74) *Attorney, Agent, or Firm* — Dennemeyer & Associates LLC; Victoria Friedman

(57) ABSTRACT

The present disclosure relates to a data snapshot method and apparatus, a computer device and a storage medium. The method includes: acquiring the capacity of to-be-written data after snapshot, and comparing the capacity of the to-be-written data with a preset capacity; when the capacity of the to-be-written data is greater than or equal to the preset capacity, writing the to-be-written data into a snapshot volume in a Redirect On Write manner; when the capacity of the to-be-written data is less than the preset capacity, writing the to-be-written data into a solid state drive in a Redirect On Write manner; and when a background write-back thread detects that there is data writing into the solid state drive, writing corresponding data in a source volume into the snapshot volume in a Copy On Write manner, and writing the to-be-written data in the solid state drive into the source volume.

20 Claims, 3 Drawing Sheets

(58) Field of Classification Search
USPC .................................................. 711/162, 161
See application file for complete search history.

(56) References Cited

FOREIGN PATENT DOCUMENTS

| | | |
|---|---|---|
| CN | 105302665 A | 2/2016 |
| CN | 108460045 A | 8/2018 |
| CN | 109213636 A | 1/2019 |
| CN | 109491605 A | 3/2019 |
| CN | 110781133 A | 2/2020 |
| CN | 111966531 A | 11/2020 |

OTHER PUBLICATIONS

Chinese office action for application 202010705961.8 filed on Jul. 21, 2020.

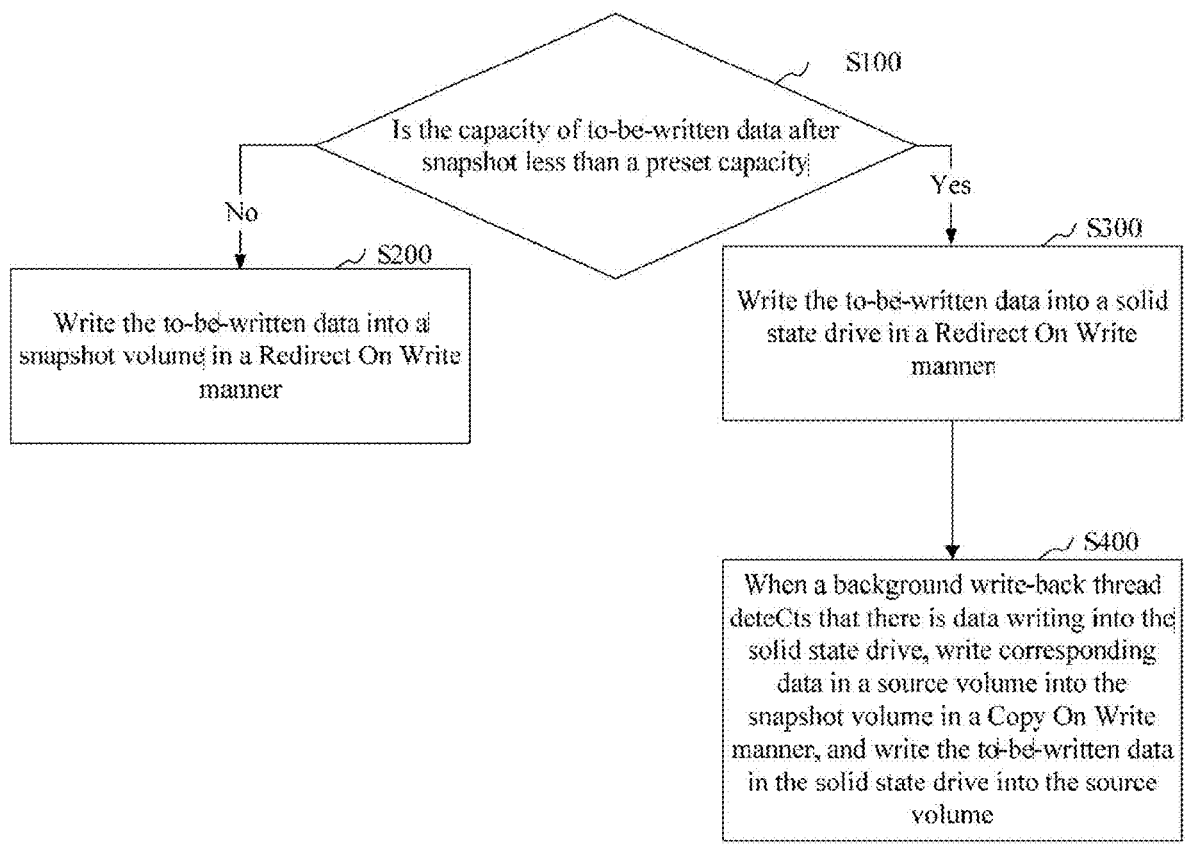
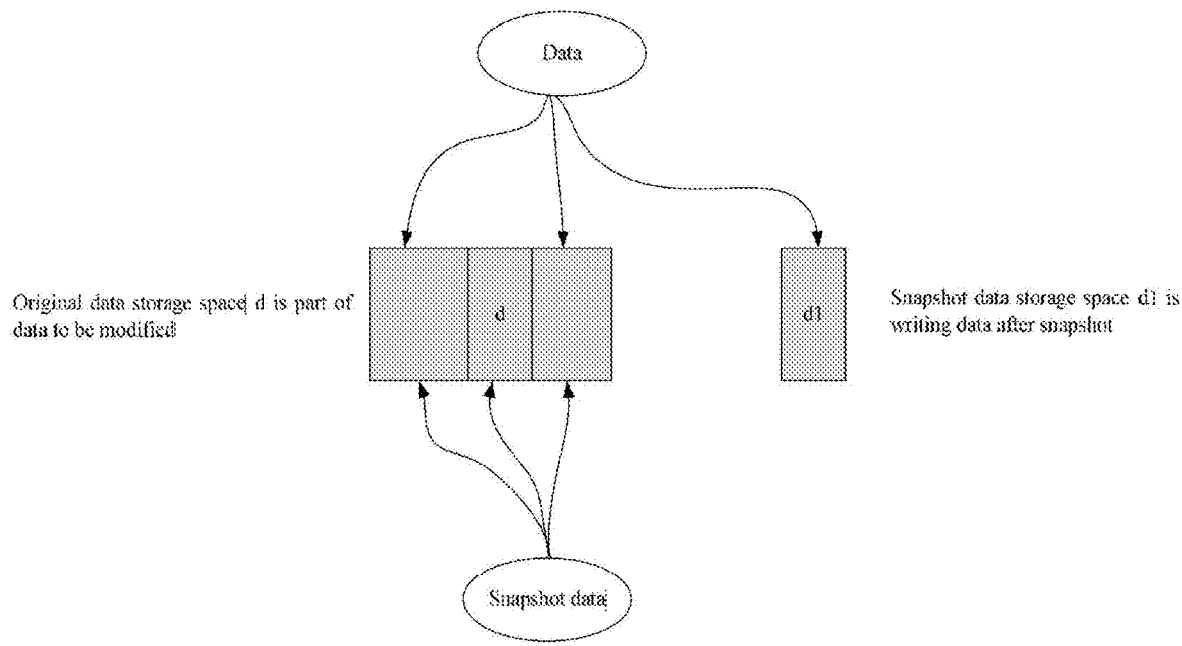

DATA SNAPSHOT METHOD AND APPARATUS, COMPUTER DEVICE, AND STORAGE MEDIUM

CROSS-REFERENCE TO RELATED APPLICATIONS

This is a 35 U.S.C. 371 National Stage Patent Application of International Application No. PCT/CN2021/077594, filed Feb. 24, 2021, which claims priority to Chinese application 202010705961.8, filed Jul. 21, 2020, each of which is hereby incorporated by reference in its entirety.

TECHNICAL FIELD

The present disclosure relates to the field of storage technology, and in particular, to a data snapshot method and apparatus, a computer device, and a storage medium.

BACKGROUND

Snapshot is a common data protection technology of a distributed storage system. The essence of snapshot is a mirror image of data at a certain time point, which may be a copy of the data and may also be a reference of the data. In existing production applications, snapshot can back up and restore on-line data periodically. When a user performs a data deletion operation by mistake, data can be rolled back to a previous timing snapshot, thereby ensuring that a service can be normally performed. Therefore, the snapshot technology becomes more and more important in production applications, and among several processing stages of a snapshot process, data copying is the core of the snapshot technology.

Currently, there are mainly two manners for data copying after snapshot. A first manner for data copying after snapshot is Copy On Write (COW for short), and the principle thereof is: after data is snapshot, when writing-in is performed for the first time, the original data at a location requiring writing-in is read out and written into a snapshot storage location, and then new written data is written into the original storage location. The advantage of such a manner is that the reading performance after snapshot does not reduce, and the disadvantage is that the writing performance after snapshot will reduce more due to copying of data at writing location. A second manner for data copying after snapshot is Redirect On Write (ROW for short), and the principle thereof is: first writing of data subjected to snapshot is directly written to a new storage location, but an index of data at the writing location needs to point to the new storage location. The advantage of this technology is that the writing performance after snapshot does not reduce, and the disadvantage is that a large number of random writes after snapshot will cause the whole data reading performance to be reduced more. Hence, in the related art, there are disadvantages in both manners of data copying after snapshot by using COW or ROW, and therefore there is an urgent need for improvement.

SUMMARY

In view of this, regarding the technical problems, it is necessary to provide a data snapshot method and apparatus, a computer device, and a storage medium, which take into account both data writing performance, and data reading performance after random writing.

According to one aspect of the present disclosure, a data snapshot method is provided, the method includes:
  acquiring the capacity of to-be-written data after snapshot, and comparing the capacity of the to-be-written data with a preset capacity;
  when the capacity of the to-be-written data is greater than or equal to the preset capacity, writing the to-be-written data into a snapshot volume in a Redirect On Write manner;
  when the capacity of the to-be-written data is less than the preset capacity, writing the to-be-written data into a solid state drive in a Redirect On Write manner; and
  when a background write-back thread detects that there is data writing into the solid state drive, writing corresponding data in a source volume into the snapshot volume in a Copy On Write manner, and writing the to-be-written data in the solid state drive into the source volume.

In an embodiment, the method further includes:
  when the to-be-written data in the solid state drive has been written into the source volume, releasing data space written in the solid state drive.

In an embodiment, the step of when the capacity of the to-be-written data is greater than or equal to the preset capacity, writing the to-be-written data into a snapshot volume in a Redirect On Write manner includes:
  acquiring the to-be-written data;
  writing the to-be-written data into a snapshot volume; and
  updating index information of newly written data in the snapshot volume.

In an embodiment, the step of when the capacity of the to-be-written data is less than the preset capacity, writing the to-be-written data into a solid state drive in a Redirect On Write manner includes:
  acquiring the to-be-written data;
  writing the to-be-written data into a solid state drive; and
  updating index information of newly written data in the solid state drive.

In an embodiment, the step of when a background write-back thread detects that there is data writing into the solid state drive, writing corresponding data in a source volume into the snapshot volume in a Copy On Write manner, and writing the to-be-written data in the solid state drive into the source volume includes:
  acquiring corresponding data of the to-be-written data in a source volume;
  writing the corresponding data of the to-be-written data into the snapshot volume, and updating index information of the snapshot volume;
  acquiring newly written data in the solid state drive; and
  replacing the corresponding data of the to-be-written data in the source volume with the newly written data in the solid state drive, and updating index information of the source volume.

In an embodiment, the preset capacity is 128KB.
In an embodiment, the source volume and the snapshot volume are both Hard Disk Drives.

According to another aspect of the present disclosure, a data snapshot apparatus is provided, the apparatus includes:
  a comparison module, configured to acquire the capacity of to-be-written data after snapshot, and compare the capacity of the to-be-written data with a preset capacity;
  a first writing module, configured to write, when the capacity of the to-be-written data is greater than or equal to the preset capacity, the to-be-written data into a snapshot volume in a Redirect On Write manner;

a second writing module, configured to write, when the capacity of the to-be-written data is less than the preset capacity, the to-be-written data into a solid state drive in a Redirect On Write manner; and a write-back module, configured to when a background write-back thread detects that there is data writing into the solid state drive, write corresponding data in a source volume into the snapshot volume in a Copy On Write manner, and write the to-be-written data in the solid state drive into the source volume.

According to another aspect of the present disclosure, a computer device is further provided, including: at least one processor; and a memory, wherein the memory stores a computer program which can be run on the at least one processor, and the computer program implements the data snapshot method above when being executed by the at least one processor.

According to another aspect of the present disclosure, a computer-readable storage medium is also provided, a computer program stored on the computer-readable storage medium, and having a computer program stored thereon, wherein the computer program is executed by a processor to implement the data snapshot method above.

In the data snapshot method and apparatus, computer device and storage medium, by comparing the capacity of to-be-written data after snapshot with a preset capacity, copying to-be-written data having a capacity equal to and exceeding the preset capacity after snapshot into a snapshot volume in a Redirect manner, copying to-be-written data having a capacity not exceeding the preset capacity after snapshot into a solid state drive in a Redirect manner, and writing data in a source volume into a snapshot volume in a Copy On Write manner, and writing to-be-written data in the solid state drive into the source volume, not only random writing performance of large blocks of data is ensured, but also reading performance of small blocks of data after random writing is ensured.

BRIEF DESCRIPTION OF THE DRAWINGS

In order to describe the technical solutions in the embodiments of the present disclosure or in the related art more clearly, hereinafter, accompanying drawings requiring to be used for describing the embodiments or the related art are introduced briefly. Apparently, the accompanying drawings in the following description merely relate to some embodiments of the present disclosure, and for a person of ordinary skill in the art, other embodiments can also be derived from these accompanying drawings without involving any inventive effort.

FIG. 1 is a schematic flowchart of a data snapshot method according to an embodiment of the present disclosure;

FIG. 2 is a schematic diagram of a writing process when to-be-written data after snapshot exceeds a preset capacity according to an embodiment of the present disclosure;

DETAILED DESCRIPTION OF THE EMBODIMENTS

Figure 3:
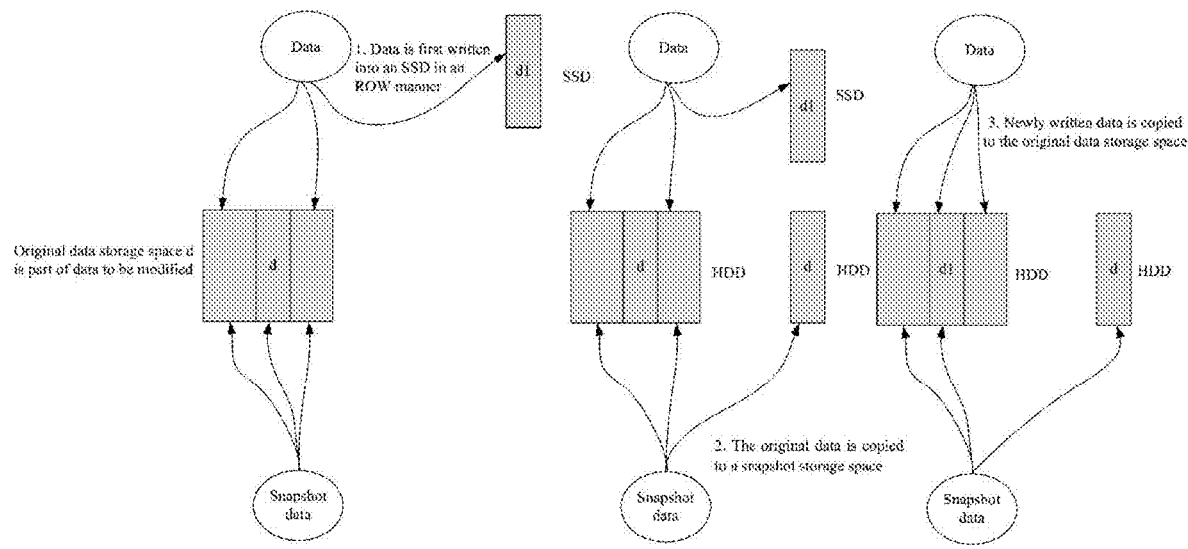
FIG. 3 is a schematic diagram of a writing process when to-be-written data after snapshot does not exceeds a preset capacity according to another embodiment of the present disclosure.

In order to make the purposes, technical solutions, and advantages of the present disclosure clearer, hereinafter, the present disclosure will be further described in detail below with reference to the drawings and embodiments.

It should be noted that in the embodiments of the present disclosure, all expressions using "first" and "second" are used for distinguishing two entities having the same names but are different or different parameters. Hence, "first" and "second" are only used for convenience of expression, and should not be understood as limitations to embodiments of the present disclosure, and this will not be described one by one in subsequent embodiments.

In an embodiment, referring to FIG. 1, in the embodiments of the present disclosure provide a data snapshot method. Specifically, the method includes the following steps:

S100, acquiring the capacity of to-be-written data after snapshot, and comparing the capacity of the to-be-written data with a preset capacity.

The to-be-written data refers to corresponding data that, after snapshot, when a snapshot software monitors and tracks changes in original data, a writing operation is performed on, and is also referred to as writing IO (Input/Output) after snapshot. The capacity of the to-be-written data is the size of data corresponding to the writing operation. Preferably, the preset capacity is 128 KB (Kilobyte). The to-be-written data is divided into large-block writing IO and small-block writing IO according to the size of the preset capacity. The large-block writing IO refers to a situation in which the capacity of the to-be-written data is greater than or equal to 128 KB, and correspondingly, the small-block writing IO refers to a situation in which the capacity of the to-be-written data is less than 128 KB.

S200, when the capacity of the to-be-written data is greater than or equal to the preset capacity, writing the to-be-written data into a snapshot volume in a Redirect On Write manner.

S300, when the capacity of the to-be-written data is less than the preset capacity, writing the to-be-written data into a solid state drive in a Redirect On Write manner.

S400, when a background write-back thread detects that there is data writing into the solid state drive, writing corresponding data in a source volume into the snapshot volume in a Copy On Write manner, and writing the to-be-written data in the solid state drive into the source volume.

The snapshot volume refers to a snapshot data storage space, and the source volume refers to an original data storage space; and preferably, the snapshot volume and the source volume are both Hard Disk Drives (HHD).

In the data snapshot method, by comparing the capacity of to-be-written data after snapshot with a preset capacity, copying to-be-written data having a capacity equal to and exceeding the preset capacity after snapshot into a snapshot volume in a Redirect manner, copying to-be-written data having a capacity not exceeding the preset capacity after snapshot into a solid state drive in a Redirect manner, and writing data in a source volume into a snapshot volume in a Copy On Write manner, and writing to-be-written data in the solid state drive into the source volume, not only random writing performance of large blocks of data is ensured, but also reading performance of small blocks of data after random writing is ensured.

Preferably, in order to facilitate subsequent storage of writing data having a capacity smaller than a preset capacity after snapshot, on the basis of the described embodiments, the method of the embodiments of the present disclosure further comprises the following step:

S500, when the to-be-written data in the solid state drive has been written into the source volume, releasing data space written in the solid state drive. Thus, after a user takes a snapshot each time, for small-block writing 10, a solid state drive can be used for temporary storage, thereby improving the use efficiency of temporarily storing data in the solid state drive, and facilitating multiple times of data writing operations after snapshot.

In another embodiment, the step S200 specifically includes the following sub-steps:

S210, acquiring the to-be-written data;

S220, writing the to-be-written data into a snapshot volume; and

S230, updating index information of newly written data in the snapshot volume.

In another embodiment, the step S300 specifically includes the following sub-steps:

S310, acquiring the to-be-written data;

S320, writing the to-be-written data into a solid state drive; and

S330, updating index information of newly written data in the solid state drive.

Preferably, the step S400 specifically includes the following sub-steps:

S410, acquiring corresponding data of the to-be-written data in a source volume;

S420, writing the corresponding data of the to-be-written data into the snapshot volume, and updating index information of the snapshot volume;

S430, acquiring newly written data in the solid state drive; and

S440, replacing the corresponding data of the to-be-written data in the source volume with the newly written data in the solid state drive, and updating index information of the source volume.

Please refer to FIG. 2, the copying process performed on writing IO greater than or equal to 128KB in a ROW manner is as follows: assuming that data to be modified in a source volume (i.e. an original data storage space) is d, and the corresponding to-be-written data is recorded as d1, in the ROW manner, a part of data, i.e. d on the original data storage space keeps unchanged, d1 is written into a new location on a snapshot volume (i.e. a snapshot data storage space), and index information of the data is updated, thereby completing writing operation of data with a data capacity greater than or equal to 128 KB after snapshot.

Further, referring to FIG. 3, a copying process performed on writing IO smaller than 128 KB is as follows: assuming that the capacity of d1 is smaller than 128 KB, first, to-be-written data 1 is written into a solid state drive in an ROW manner, and after the data d1 is stored on the solid state drive, index information of the data is updated; a background write-back thread monitors whether there is new data written into the solid state drive, and when there is new data written on the solid state drive, data write-back is performed in a COW manner, and the write-back process is to copy data d on a source volume (i.e. an original data storage space) to a snapshot volume (i.e. a snapshot data storage space), and after the data d is stored on the snapshot data storage space, index information of the snapshot data is updated, and the index information of the snapshot data is ensured to be stored; and finally, data d1 on the solid state drive is copied to the location of the original data d to cover the data d, and after the data d1 is stored on the original data storage space, index information of the data is updated, and the index information of the data is stored. Thus, the IO performance after snapshot not only ensures the data writing performance, but also ensures the reading performance after random writing of a large number of small IO.

Figure 4:
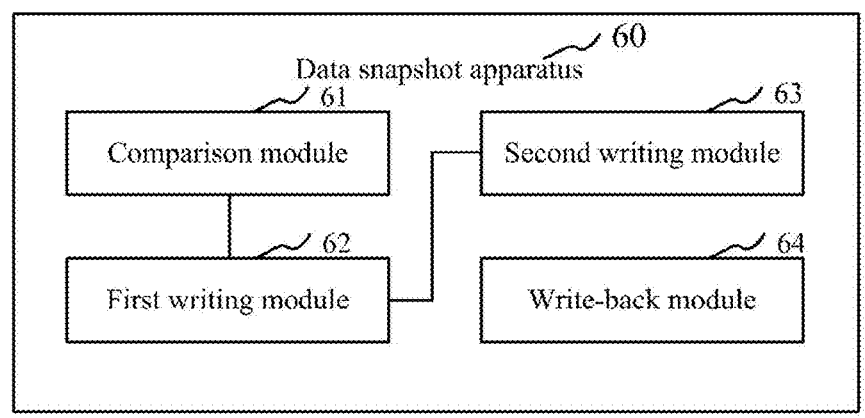
FIG. 4 is a schematic diagram of a data snapshot apparatus according to an embodiment of the present disclosure.

In another embodiment, referring to FIG. 4, the embodiments of the present disclosure further provide a data snapshot apparatus 60. Specifically, the apparatus includes:

a comparison module 61, configured to acquire the capacity of to-be-written data after snapshot, and compare the capacity of the to-be-written data with a preset capacity;

a first writing module 62, configured to write, when the capacity of the to-be-written data is greater than or equal to the preset capacity, the to-be-written data into a snapshot volume in a Redirect On Write manner;

a second writing module 63, configured to write, when the capacity of the to-be-written data is less than the preset capacity, the to-be-written data into a solid state drive in a Redirect On Write manner; and a write-back module 64, configured to when a background write-back thread detects that there is data writing into the solid state drive, write corresponding data in a source volume into the snapshot volume in a Copy On Write manner, and write the to-be-written data in the solid state drive into the source volume.

In the data snapshot apparatus, by comparing the capacity of to-be-written data after snapshot with a preset capacity, copying to-be-written data having a capacity equal to and exceeding the preset capacity after snapshot in a Redirect manner, copying to-be-written data having a capacity not exceeding the preset capacity after snapshot into a solid state drive in a Redirect manner, and writing data in a source volume into a snapshot volume in a Copy On Write manner, and writing to-be-written data in the solid state drive into the source volume, not only random writing performance of large blocks of data is ensured, but also reading performance of small blocks of data after random writing is ensured.

For specific definitions of the data snapshot apparatus, reference can be made to the described definitions on the data snapshot method, and details are not repeated herein. All or some of the modules in the data snapshot apparatus may be implemented by software, hardware, or a combination thereof. The various modules may be embedded in or independent from a processor in a computer device in a hardware form, and may also be stored in a memory in the computer device in a software form, so that the processor invokes and executes operations corresponding to the various modules.

Figure 5:
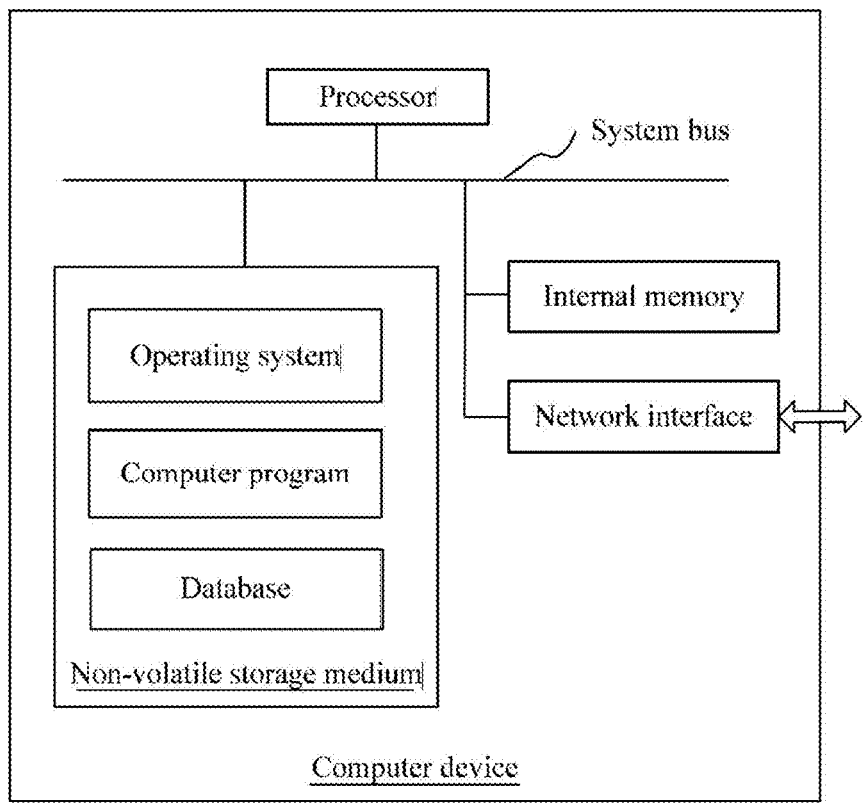
FIG. 5 is an internal structural diagram of a computer device according to an embodiment of the present disclosure.

According to another aspect of the embodiments of the present disclosure, a computer device is provided. The computer device may be a server, and for an internal structural diagram thereof, please refer to FIG. 5. The computer device comprises a processor, a memory, a network interface, and a database which are connected via a system bus. The processor of the computer device is configured to provide computing and control capabilities. The memory of the computer device includes a non-volatile storage medium and an internal memory. The non-transitory storage medium stores an operating system, a computer program, and a database. The internal memory provides an environment for running of the operating system and the computer program in the non-transitory storage medium. The database of the computer device is used for storing data. The network interface of the computer device is configured to communicate with an external terminal via network connection. The computer program, when executed by the processor, implements the data snapshot method above.

Figure 6:
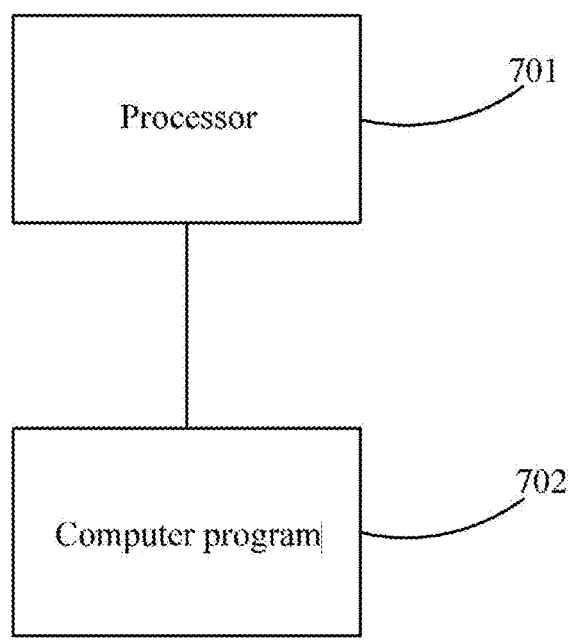
FIG. 6 is a schematic diagram of a computer-readable storage medium according to an embodiment of the present disclosure.

According to another aspect of the embodiments of the present disclosure, a computer-readable storage medium is provided. As shown in FIG. 6, a computer program 702 is stored on the computer-readable storage medium, and when the computer program 702 is executed by a processor 701, the data snapshot method as described above is implemented.

A person of ordinary skill in the art would have been able to understand that all or a part of flow of the method according to the embodiments may be implemented by a computer program instructing relevant hardware. The computer program may be stored in a non-transitory computer-readable storage medium. When being executed, the computer program may comprise the flow of the embodiments of the method. Any references to memory, storage, database, or other media used in the embodiments provided in the embodiments of the present disclosure may comprise non-transitory and/or transitory memory. The non-transitory memory may include Read-Only Memory (ROM), Programmable ROM (PROM), Electrically Programmable ROM (EPROM), Electrically Erasable Programmable ROM (EEPROM), or flash memory. The transitory memory may include Random Access Memory (RAM) or an external cache memory. By way of illustration but not limitation, RAM is available in a variety of forms, such as Static RAM (SRAM), Dynamic RAM (DRAM), Synchronous DRAM (SDRAM), Double Data Rate SDRAM (DDRSDRAM), Enhanced SDRAM (ESDRAM), synchronous link (Synchlink) DRAM (SLDRAM), memory bus (Rambus) Dynamic RAM (RDRAM), and Direct Rambus Dynamic RAM (DRDRAM), etc.

Various technical features of the embodiments can be combined in any way, and in order to make the description brief, all possible combinations of the technical features of the embodiments are not described. However, as long as the combination of these technical features is not contradictory, the technical features should be considered to fall within the scope disclosed in the description.

The embodiments as described above merely represent several embodiments of the present disclosure, and the illustration thereof is specific and detailed, but the specific and detailed illustration cannot be understood as limiting the patent scope of some embodiments of the present disclosure. It should be noted that for a person of ordinary skill in the art, several modifications and improvements can be made without departing from the concept of some embodiments of the present disclosure, and all these modifications and improvements fall within the scope of protection of some embodiments of the present disclosure. Therefore, the patent scope of protection of the present disclosure shall be subject to the appended claims.

The invention claimed is:

1. A data snapshot method, the method comprising:
    acquiring the capacity of to-be-written data after snapshot, and comparing the capacity of the to-be-written data with a preset capacity;
    when the capacity of the to-be-written data is greater than or equal to the preset capacity, writing the to-be-written data into a snapshot volume in a Redirect On Write manner;
    when the capacity of the to-be-written data is less than the preset capacity, writing the to-be-written data into a solid state drive in a Redirect On Write manner; and
    when a background write-back thread detects that there is data writing into the solid state drive, writing corresponding data in a source volume into the snapshot volume in a Copy On Write manner, and writing the to-be-written data in the solid state drive into the source volume.

2. The method according to claim 1, wherein the method further comprises:
    when the to-be-written data in the solid state drive has been written into the source volume, releasing data space written in the solid state drive.

3. The method according to claim 1, wherein the step of when the capacity of the to-be-written data is greater than or equal to the preset capacity, writing the to-be-written data into a snapshot volume in a Redirect On Write manner comprises:
    acquiring the to-be-written data;
    writing the to-be-written data into a snapshot volume; and
    updating index information of newly written data in the snapshot volume.

4. The method according to claim 1, wherein the step of when the capacity of the to-be-written data is less than the preset capacity, writing the to-be-written data into a solid state drive in a Redirect On Write manner comprises:
    acquiring the to-be-written data;
    writing the to-be-written data into a solid state drive; and
    updating index information of newly written data in the solid state drive.

5. The method according to claim 1, wherein the step of when a background write-back thread detects that there is data writing into the solid state drive, writing corresponding data in a source volume into the snapshot volume in a Copy On Write manner, and writing the to-be-written data in the solid state drive into the source volume comprises:
    acquiring corresponding data of the to-be-written data in a source volume;
    writing the corresponding data of the to-be-written data into the snapshot volume, and updating index information of the snapshot volume;
    acquiring newly written data in the solid state drive; and
    replacing the corresponding data of the to-be-written data in the source volume with the newly written data in the solid state drive, and updating index information of the source volume.

6. The method according to claim 1, wherein the preset capacity is 128 KB.

7. The method according to claims 1, wherein the source volume and the snapshot volume are both Hard Disk Drives.

8. The method according to claim 1, wherein the to-be-written data refers to corresponding data that, after snapshot, when a snapshot software monitors and tracks changes in original data, a writing operation is performed on.

9. The method according to claim 8, wherein the capacity of the to-be-written data is the size of data corresponding to the writing operation.

10. The method according to claim 1, wherein the snapshot volume refers to a snapshot data storage space, and the source volume refers to an original data storage space.

11. The method according to claim 3, wherein when the to-be-written data is written into a snapshot volume, data to be modified in the source volume keeps unchanged.

12. The method according to claim 5, wherein the step of replacing the corresponding data of the to-be-written data in the source volume with the newly written data in the solid state drive comprises:
    copying the newly written data in the solid state drive to location of the to-be-written data in the source volume to cover the to-be-written data.

13. The system according to claim 5, wherein after updating index information of the source volume, the method further comprises:
    storing the index information of the source volume.

14. A computer device, comprising:
    at least one processor; and
    a memory, wherein the memory stores a computer program which can be run on the at least one processor, and the computer program, when being executed by the at least one processor, causes the at least one processor to:
    acquiring the capacity of to-be-written data after snapshot, and comparing the capacity of the to-be-written data with a preset capacity;
    under the condition that the capacity of the to-be-written data is greater than or equal to the preset capacity, writing the to-be-written data into a snapshot volume in a Redirect On Write manner;
    under the condition that the capacity of the to-be-written data is less than the preset capacity, writing the to-be-written data into a solid state drive in a Redirect On Write manner; and
    under the condition that a background write-back thread detects that there is data writing into the solid state drive, writing corresponding data in a source volume into the snapshot volume in a Copy On Write manner, and writing the to-be-written data in the solid state drive into the source volume.

15. The computer device according to claim 14, wherein the computer program, when being executed by the at least one processor, causes the at least one processor to:
    under the condition that the to-be-written data in the solid state drive has been written into the source volume, releasing data space written in the solid state drive.

16. The computer device according to claim 14, wherein the computer program, when being executed by the at least one processor, causes the at least one processor to:
    acquiring the to-be-written data;
    writing the to-be-written data into a snapshot volume; and
    updating index information of newly written data in the snapshot volume.

17. The computer device according to claim 14, wherein the computer program, when being executed by the at least one processor, causes the at least one processor to:
    acquiring the to-be-written data;
    writing the to-be-written data into a solid state drive; and
    updating index information of newly written data in the solid state drive.

18. The computer device according to claim 14, wherein the computer program, when being executed by the at least one processor, causes the at least one processor to:
    acquiring corresponding data of the to-be-written data in a source volume;
    writing the corresponding data of the to-be-written data into the snapshot volume, and updating index information of the snapshot volume;
    acquiring newly written data in the solid state drive; and
    replacing the corresponding data of the to-be-written data in the source volume with the newly written data in the solid state drive, and updating index information of the source volume.

19. The computer device according to claim 18, wherein the computer program, when being executed by the at least one processor, causes the at least one processor to:
    copying the newly written data in the solid state drive to location of the to-be-written data in the source volume to cover the to-be-written data.

20. A non-transitory computer-readable storage medium, wherein a computer program stored on the computer-readable storage medium, and when the computer program is executed by at least one processor, the computer program following operations are implemented:
    acquiring the capacity of to-be-written data after snapshot, and comparing the capacity of the to-be-written data with a preset capacity;
    under the condition that the capacity of the to-be-written data is greater than or equal to the preset capacity, writing the to-be-written data into a snapshot volume in a Redirect On Write manner;
    under the condition that the capacity of the to-be-written data is less than the preset capacity, writing the to-be-written data into a solid state drive in a Redirect On Write manner; and
    under the condition that a background write-back thread detects that there is data writing into the solid state drive, writing corresponding data in a source volume into the snapshot volume in a Copy On Write manner, and writing the to-be-written data in the solid state drive into the source volume.

* * * * *